US012590925B2

(12) United States Patent
Chen et al.

(10) Patent No.: US 12,590,925 B2
(45) Date of Patent: Mar. 31, 2026

(54) COILED TUBING AND CASING INSPECTION BASED ON MAGNETIC FLUX LEAKAGE MEASUREMENTS

(71) Applicant: Schlumberger Technology Corporation, Sugar Land, TX (US)

(72) Inventors: Yong-Hua Chen, Belmont, MA (US); Zhanke Liu, Cambridge, MA (US); Lin Liang, Belmont, MA (US); Tarek M. Habashy, Burlington, MA (US); Saad Omar, Sharon, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 19/221,765

(22) Filed: May 29, 2025

(65) Prior Publication Data

US 2025/0369922 A1     Dec. 4, 2025

Related U.S. Application Data

(60) Provisional application No. 63/654,390, filed on May 31, 2024.

(51) Int. Cl.
*G01N 27/00* (2006.01)
*G01N 27/83* (2006.01)

(52) U.S. Cl.
CPC .................................... *G01N 27/83* (2013.01)

(58) Field of Classification Search
CPC ...................................................... G01N 27/83
See application file for complete search history.

(56) References Cited

U.S. PATENT DOCUMENTS 4,675,604 A * 6/1987 Moyer .................. G01N 27/82
324/262
5,914,596 A * 6/1999 Weinbaum ............. G01N 29/27
324/228
(Continued)

FOREIGN PATENT DOCUMENTS

CN 106680741 A * 5/2017 ............. G01N 27/82
GB 2180652 A * 4/1987 ............. G01N 27/82
(Continued)

OTHER PUBLICATIONS

Stanley, R. K., "Results of a New Coiled-Tubing Assessment Tool", SPE/I1CoTA Coiled Tubing Well Intervention Conference and Exhibition, SPE-141944-MS, Apr. 5-6, 2011, pp. 1-8, The Woodlands, Texas, USA.
(Continued)

*Primary Examiner* — Mi'schita' Henson
(74) *Attorney, Agent, or Firm* — Kyle R. Miiller

(57) ABSTRACT

The present disclosure provide techniques and apparatus for magnetic flux leakage (MFL) testing for casing inspection and coiled tubing inspection. An example technique includes operating an inspection tool including at least one sensor arranged in proximity to a coiled tubing. A first set of MFL measurements associated with a first liftoff distance of the sensor with respect to a surface of the coiled tubing is obtained using the inspection tool. A second set of MFL measurements associated with a second liftoff distance of the sensor with respect to the surface of the coiled tubing is generated, based on performing a filtering operation on the first set of MFL measurements. The second liftoff distance is less than the first liftoff distance. At least one defect of the coiled tubing is determined based on the second set of MFL measurements.

20 Claims, 16 Drawing Sheets

(56) References Cited

U.S. PATENT DOCUMENTS

| | | | |
|---|---|---|---|
| 11,656,199 B2 | 5/2023 | Chen | |
| 11,710,489 B2 * | 7/2023 | Papadimitriou | G10L 17/00 |
| | | | 704/275 |
| 2019/0145932 A1 * | 5/2019 | Feng | G01N 29/24 |
| | | | 324/226 |
| 2022/0290967 A1 * | 9/2022 | Reeves | G01N 29/225 |
| 2023/0184717 A1 * | 6/2023 | Pham | G01N 27/82 |
| | | | 324/622 |
| 2024/0044842 A1 * | 2/2024 | Medeiros Fonseca | |
| | | | G01N 27/83 |

FOREIGN PATENT DOCUMENTS

| | | | | |
|---|---|---|---|---|
| JP | H08145952 A | * | 6/1996 | |
| JP | 2001183346 A | * | 7/2001 | |
| JP | 2019020273 A | * | 2/2019 | |

OTHER PUBLICATIONS

Zheng, A. et al., "State-of-the-Art Portable Measurement and Defect Detection Technology for Coiled Tubing String", SPE/ICoTA Coiled Tubing Well Intervention Conference Exhibition, SPE-163945-MS, Mar. 26-27, 2013, pp. 1-8, The Woodlands, Texas, USA.
Liu, Z. et al., "Steel Coiled Tubing Defect Evaluation Using Magnetic Flux Leakage Signals", SPE/ICoTA Coiled Tubing and Well Intervention Conference and Exhibition, SPE-168260-MS, Mar. 25-26, 2014, pp. 1-16, The Woodlands, Texas, USA.

* cited by examiner

With Integration and Scaling

With Deconvolution, Integration, and Scaling

500

| Peak Leaked Field | Actual Depth (mm) | Length(mm) / Actual | Width(mm) / Actual | Aspect Ratio 1 / Actual | Aspect Ratio 2 / Actual |
|---|---|---|---|---|---|
| 6835 | 1.37 | 4.41 / 4.7 | 4.39 / 4.7 | 0.92 / 1 | 1.00 / 1 |
| 22759 | 2.38 | 7.70 / 9.5 | 6.10 / 9.5 | 1.00 / 1 | 1.26 / 1 |
| 5287 | 1.27 | 3.78 / 2.1 | 4.81 / 6.4 | 0.73 / 0.33 | 0.79 / 0.33 |
| 16038 | 2.41 | 4.60 / 3.4 | 6.46 / 10.2 | 0.70 / 0.33 | 0.71 / 0.33 |
| 1777 | 1.14 | 5.87 / 6.4 | 3.43 / 1.3 | 1.16 / 5 | 1.71 / 5 |
| 2744 | 1.52 | 7.54 / 7.6 | 4.66 / 1.5 | 1.12 / 5 | 1.62 / 5 |
| 6712 | 2.54 | 10.9 / 11.4 | 4.34 / 2.3 | 1.45 / 5 | 2.51 / 5 |
| 5519 | 2.29 | 9.82 / 10.2 | 4.47 / 2.0 | 1.33 / 5 | 2.19 / 5 |
| 11561(circ) | 1.70 | 5.39 / 6.35 | 5.02 / 6.35 | 0.97 / 1 | 1.07 / 1 |

| Defect Index | Axial Location | Azimuth Location | Peak Value | Aspect Ratio |
|---|---|---|---|---|
| 1 | 265 | 46 | 29018 | 1.09 |
| 2 | 209 | 39 | 28103 | 1.06 |
| 3 | 55 | 46 | 27578 | 0.94 |
| 4 | 85 | 39 | 26734 | 0.80 |
| 5 | 157 | 46 | 26546 | 1.11 |
| 6 | 121 | 39 | 21985 | 1.21 |

FIG. 9

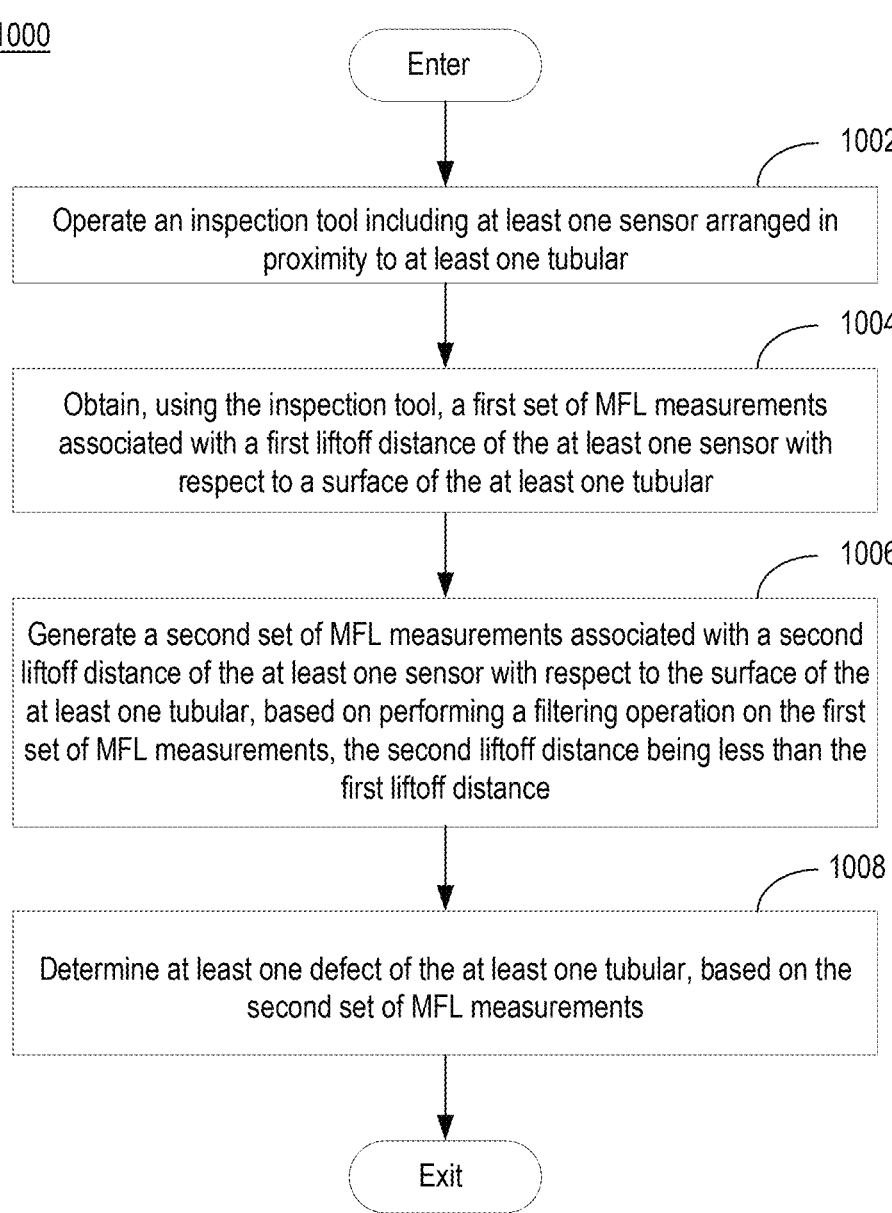

1000

Enter

1002

Operate an inspection tool including at least one sensor arranged in proximity to at least one tubular

1004

Obtain, using the inspection tool, a first set of MFL measurements associated with a first liftoff distance of the at least one sensor with respect to a surface of the at least one tubular

1006

Generate a second set of MFL measurements associated with a second liftoff distance of the at least one sensor with respect to the surface of the at least one tubular, based on performing a filtering operation on the first set of MFL measurements, the second liftoff distance being less than the first liftoff distance

1008

Determine at least one defect of the at least one tubular, based on the second set of MFL measurements Exit

FIG. 10

COILED TUBING AND CASING INSPECTION BASED ON MAGNETIC FLUX LEAKAGE MEASUREMENTS

CROSS-REFERENCE TO RELATED APPLICATION

This application claims benefit of and priority to U.S. Provisional Patent Application Ser. No. 63/654,390, filed May 31, 2024, which is hereby incorporated by reference herein in its entirety for all applicable purposes.

BACKGROUND

Field of the Disclosure

The present disclosure relates to systems and methods for inspecting coiled tubing and well casings. More specifically, the present disclosure provides techniques and apparatus for using magnetic flux leakage (MFL) testing to perform coiled tubing inspection and casing inspection.

Description of Related Art

Magnetic flux leakage (MFL) tools are widely used to inspect tubulars used for oil and gas wells (e.g., coiled tubing, well casing, etc.) for potential defects due to mechanical damages, corrosion, and fatigue, as illustrative examples. Flux leakage generally relates to a distortion of the magnetic flux that has been introduced into a tubular (also referred to as a pipe or tubing) by an electromagnet or permanent magnet. The principle of magnetic flux leakage is used to detect tubular defects (e.g., corrosion), since magnetic flux leakage is caused by rapid changes in the thickness of the tubular and by pits and holes in either the internal or external wall. Tubular defects distort the magnetic-flux lines and induce a signal into a magnetic sensor moving past it. In-situ magnetic flux leakage measurements make use of this effect by placing a magnetic sensor on or close to the tubular surface, azimuthally distributed to cover the entire surface. The results are often combined with a high frequency, eddy-current measurement, or magnetostatic sensors designed to detect flaws on the (inner or outer) tubular surface, e.g., depending on whether the tubular is coiled tubing or a well casing.

For coiled tubing inspection, multiple axially polarized permanent magnets or electromagnets are placed outside of the coiled tubing to excite axial magnetostatic fields inside the steel tubing wall. For casing inspection, the magnets are generally placed inside of the casing to excite axial magnetostatic fields traversing through the casing. Thus, in coiled tubing inspection, the radial direction may extend inward from the central tubing axis; whereas in casing inspection, the radial direction may extend outward from the central tubing axis.

In both coiled tubing inspection and casing inspection, the magnetic flux flow generally remains undisturbed within the tubing wall if the shape and properties of the steel tubing do not vary. On the other hand, presence of defects or corroded spots in the steel tubing may disturb the magnetic flux flow and cause the magnetic flux to leak out of the tubing wall. In a magnetic flux leakage tool, the leaked magnetic flux can be detected by magnetic field sensors placed in proximity to the steel tubing's surface. The measured (or acquired) data for coiled tubing inspection and casing inspection may include the radial (or normal), the axial, and the azimuthal components of the magnetic fields. The measured data can be used to form two-dimensional (2D) images of the tubing wall, with field variations indicating defects or corroded spots in the tubing.

SUMMARY

One embodiment of the present disclosure described herein is a method. The method includes operating an inspection tool comprising at least one sensor arranged in proximity to a coiled tubing. The method also includes obtaining, using the inspection tool, a first set of magnetic flux leakage (MFL) measurements associated with a first liftoff distance of the at least one sensor with respect to a surface of the coiled tubing. The method also includes generating a second set of MFL measurements associated with a second liftoff distance of the at least one sensor with respect to the surface of the coiled tubing, based on performing a filtering operation on the first set of MFL measurements, the second liftoff distance being less than the first liftoff distance. The method further includes determining at least one defect of the coiled tubing, based on the second set of MFL measurements.

Another embodiment of the present disclosure described herein is a system. The system includes one or more memories collectively storing instructions, and one or more processors communicatively coupled to the one or more memories. The one or more processors are collectively configured to execute the instructions to cause the system to: operate an inspection tool comprising at least one sensor arranged in proximity to a coiled tubing; obtain, using the inspection tool, a first set of magnetic flux leakage (MFL) measurements associated with a first liftoff distance of the at least one sensor with respect to a surface of the coiled tubing; generate a second set of MFL measurements associated with a second liftoff distance of the at least one sensor with respect to the surface of the coiled tubing, based on performing a filtering operation on the first set of MFL measurements, the second liftoff distance being less than the first liftoff distance; and determine at least one defect of the coiled tubing, based on the second set of MFL measurements.

Another embodiment of the present disclosure is a non-transitory computer-readable storage medium. The non-transitory computer-readable storage medium includes computer-executable code, which when executed by one or more processors of a computing system perform an operation. The operation includes operating an inspection tool comprising at least one sensor arranged in proximity to a coiled tubing. The operation also includes obtaining, using the inspection tool, a first set of magnetic flux leakage (MFL) measurements associated with a first liftoff distance of the at least one sensor with respect to a surface of the coiled tubing. The operation also includes generating a second set of MFL measurements associated with a second liftoff distance of the at least one sensor with respect to the surface of the coiled tubing, based on performing a filtering operation on the first set of MFL measurements, the second liftoff distance being less than the first liftoff distance. The operation further includes determining at least one defect of the coiled tubing, based on the second set of MFL measurements.

The following description and the appended figures set forth certain features for purposes of illustration.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

FIG. 5 illustrates a table of processed results for acquired normal field datasets for different defects on different coiled tubing, according to certain embodiments.

FIG. 9 illustrates a table indicating parameters of the defects illustrated in FIG. 8B, according to certain embodiments.

FIG. 10 is a flow diagram depicting example operations for MFL testing, according to certain embodiments.

DETAILED DESCRIPTION

Figure 1:
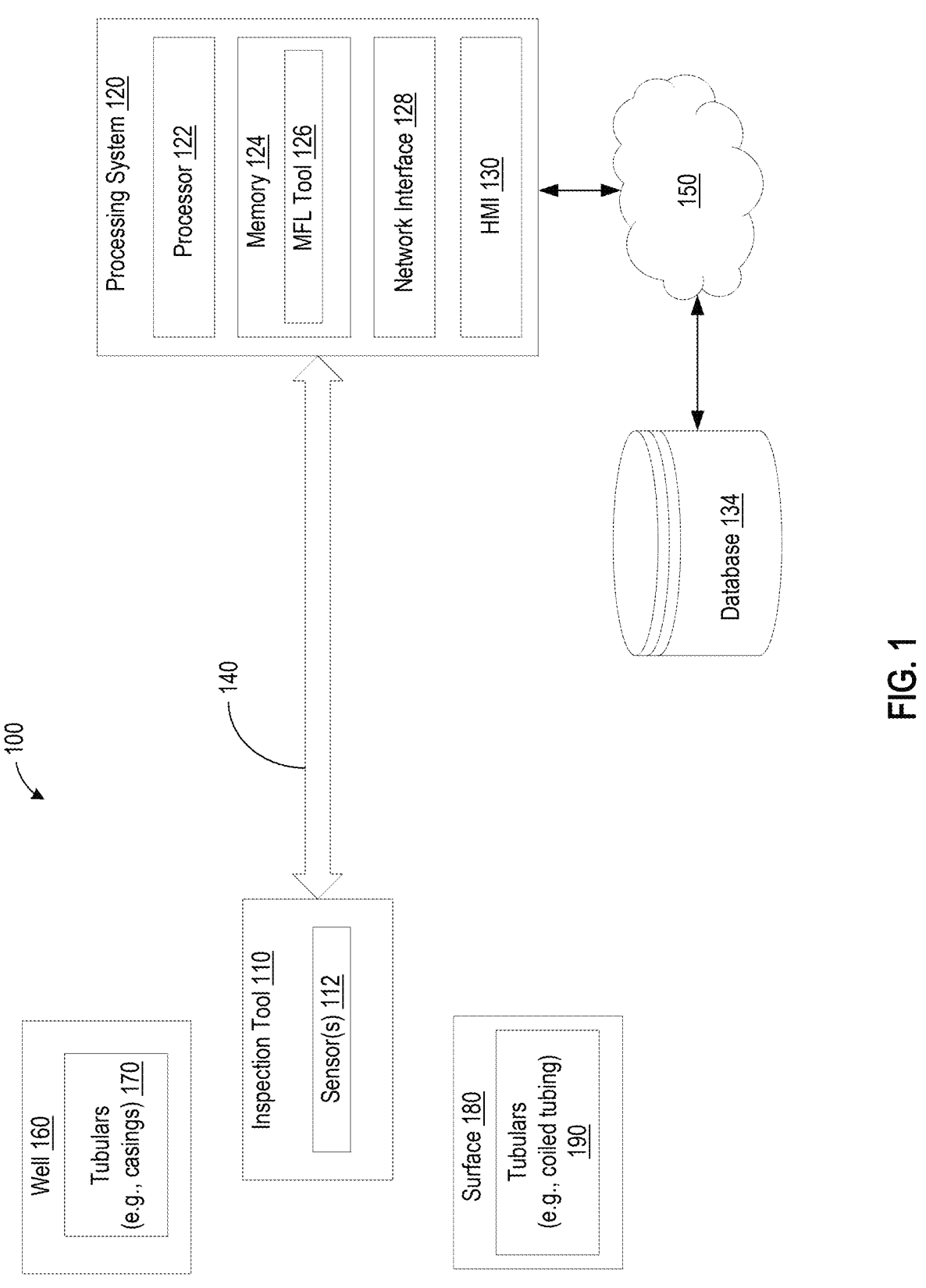
FIG. 1 is a schematic diagram of an example system, according to certain embodiments.

One challenge associated with conventional magnetic flux leakage (MFL) testing tools is that, in some cases, certain defects (e.g., corrosion) within tubulars (e.g., pipes, such as coiled tubing, casings, etc.) as well as parameters of the defects (e.g., size, shape, etc.) may be difficult to determine with MFL measurements obtained using conventional MFL testing techniques. For example, acquired MFL data for well testing, including coiled tubing inspection and casing inspection, may include radial, axial, and azimuthal components of the magnetic fields. This MFL data can be used to generate images of the tubular walls with filed variations indicating defects or corroded spots in the tubulars.

However, in certain cases, the quality of the images (or, more generally, the MFL readings or responses) may be significantly affected by the sensor liftoff, which is the distance between the magnetic sensor and the surface of the tubular being inspected. In particular, the distance between the magnetic sensor and the tubular's surface influences the resolution of the images formed by the recorded magnetic fields and the strength of the magnetic field signal detected by the sensor. As this distance increases, the resolution of the recoded image reduces and the amplitude of the leakage magnetic field detected by the sensor decreases, reducing detection sensitivity which, in turn, can lead to inaccurate defect detection and evaluation. In MFL data, for example, the shapes of the images of the leakage magnetic fields may significantly differ from those of the actual defects, particularly for the radial and azimuthal field components. Accordingly, there exists a need for further improvements in performing MFL testing and evaluation.

The disclosure provides techniques, methods, systems, apparatus, and computer-readable media for improved MFL evaluation for coiled tubing inspection and casing inspection. For example, the disclosure provides techniques for removing (or at least reducing) the effect of sensor liftoff and/or bringing the measured fields closer to the surface of the tubulars when generating images based on MFL data obtained via MFL testing. In certain embodiments, the techniques described herein involve obtaining a first set of MFL measurements via an inspection tool having at least one sensor (e.g., magnetic sensor) arranged in proximity to a surface of a tubular. A filtering operation is performed on the first set of MFL measurements in order to generate a second set of MFL measurements. The first set of MFL measurements is associated with a first liftoff distance of the sensor and the second set of MFL measurements is associated with a second liftoff distance of the sensor that is less than the first liftoff distance. Defect(s) of the tubular may be determined based on the second set of MFL measurements.

In certain embodiments, the filtering operation includes performing an analytical outward continuation of the first set of MFL measurements to one or more outward liftoff distances, each greater than the first liftoff distance, followed by an extrapolation from the outward liftoff distances to the second liftoff distance. In other embodiments, the filtering operation includes applying a regularized deconvolution filter to the first set of MFL measurements to generate the second set of MFL measurements. In certain embodiments, the analytical outward continuation and extrapolation technique, the regularized deconvolution technique, or a combination thereof, may be used for all three field components (e.g., radial component, axial component, and azimuthal component) of the MFL measurements.

Additionally, in certain embodiments, the filtering operation further includes integrating a radial field component and/or an azimuthal field component of the deconvolved first set of MFL measurements along an axial direction. In some such embodiments, the filtering operation also includes calibrating the integrated MFL measurements based on one or more MFL measurements. Additionally or alternatively, in certain embodiments, the filtering operation further includes scaling the first set of MFL measurements according to a predefined scaling parameter.

The techniques, methods, systems, apparatus, and computer readable media for improved MFL evaluation for coiled tubing inspection and casing inspection may provide various advantages. For example, the filtering techniques described herein can remove (or at least reduce) the effect of sensor liftoff from obtained MFL measurements when using such MFL measurements to determine the presence of defects within tubulars along with parameters (e.g., size, shape, aspect ratio, etc.) of the defects. For instance, notwithstanding the (first) set of MFL measurements being obtained at a certain liftoff distance, the filtering techniques described herein can bring the measured fields closer to the surface of the tubulars for determining the presence of defects within the tubulars along with parameters of the defects. By bringing removing (or at least reducing) the effect of sensor liftoff and/or bringing the measured fields closer to the surface of the tubulars, embodiments described herein can significantly enhance the quality of images generated from the obtained MFL measurements (e.g., in terms of improved sharpness, improved contrast, reduce noise, higher dynamic range, among other parameters) compared to conventional MFL techniques.

Additionally, when using conventional MFL techniques, it may be significantly difficult to ascertain certain defect parameters from the radial field component and/or azimuthal field component of the MFL measurements. For example, for the radial field component and/or the azimuthal field component, the patterns of the leakage magnetic fields may significantly differ from those of the underlying tubular defects. However, by integrating the radial field component and/or the azimuthal field component of the MFL measurements along the axial direction, certain embodiments described herein can significantly improve defect determination and estimation from the radial field component and/or azimuthal field component of the MFL measurements. For example, the field patterns may more closely reflect those of the underlying tubular defects if the radial field component and/or azimuthal field component are integrated along the tubular axis.

Further, with conventional MFL testing, it may be difficult to accurately ascertain certain parameters of the tubular defects (e.g., aspect ratio, geometric shapes, etc.) since the leakage magnetic fields tend to spread far beyond the actual azimuthal span of the defects. However, by scaling the MFL measurements (and/or a processed version of the MFL measurements) according to a predefined scaling parameter, certain embodiments described herein can improve the quality of the images, such that the aspect ratio and geometric shapes of the images more accurately reflect the aspect ratio and geometric shapes of the tubular defects.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Although the terms "first," "second," "third," etc., may be used herein to describe various elements, components, regions, layers and/or sections, these elements, components, regions, layers and/or sections should not be limited by these terms. These terms may be only used to distinguish one element, component, region, layer or section from another element, component, region, layer, or section. Terms such as "first," "second," and other numerical terms, when used herein, do not imply a sequence or order unless clearly indicated by the context. Thus, a first element, component, region, layer, or section discussed herein could be termed a second element, component, region, layer, or section without departing from the teachings of the example embodiments.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

Example System for Performing Magnetic Flux Leakage Testing

FIG. 1 is a schematic diagram of at least a portion of an example implementation of a system 100 for performing MFL testing, according to certain embodiments. As shown, the system 100 includes, without limitation, a processing system 120, a database 134, and an inspection tool 110. The processing system 120 and database 134 may be interconnected via a network 150. The network 150 is representative of a variety of networks, such as a personal area network (PAN) (e.g., a Bluetooth network), a local area network (LAN) (e.g., 802.11 or WiFi network), and a wide area network (WAN) (e.g., cellular network), as illustrative examples.

The processing system 120 is generally representative of a variety of computing systems, such as laptops, servers, desktops, and mainframes, as illustrative examples. In certain embodiments, the processing system 120 (including one or more components therein) is located in (or otherwise accessible via) a cloud computing environment. The processing system 120 may be implemented using hardware, software, or a combination of hardware and software.

The database 134 is generally representative of one or more storage systems configured to store information associated with MFL testing. For example, the database 134 may store MFL measurements obtained via the inspection tool 110. The database 134 may be implemented using hardware, software, or a combination of hardware and software. In certain embodiments, the database 134 is located in (or otherwise accessible via) a cloud computing environment.

The inspection tool 110 may be controlled to measure and/or generate data including MFL measurements associated with one or more tubulars 170, one or more tubulars 190, or a combination thereof. In certain cases, the inspection tool 110 may be used to inspect casings (e.g., tubulars 170) within a well 160. In such cases, the inspection tool 110 may be deployed within a well 160 having one or more (nested) casings (e.g., tubulars 170). In other cases, the inspection tool 110 may be used to inspect coiled tubing (e.g., tubulars 190) at the surface 180 (e.g., above ground). The tubulars 170 and 190 represent lengths of pipe including threads and/or other means for connecting each end to threads and/or other connection means of a tubular. Each tubular 170 and/or 190 may be made of steel and/or other electrically conductive materials able to withstand a variety of forces, such as collapse, burst, and tensile failure, as well as chemically-aggressive fluid. Each tubular 170 may have magnetic properties and be affected by electromagnetic current.

In certain cases, the inspection tool 110 may be centered or decentered (e.g., eccentered) with respect to the tubular 170 or 190, such that a measuring and/or detecting device (e.g., sensor 112) of the inspection tool 110 is positioned centrally or off-center relative to a central longitudinal axis of the tubulars 170 or 190. The sensors 112 are generally representative of magnetic field sensors, such as Hall effect sensors, giant magneto-resistive (GMR) sensors, or other devices capable of measuring the magnetic field strength. For tubulars 170, the sensors 112 may be placed in proximity to the inner surface of the tubular 170 to detect the variation of the magnetic field due to the possible existence of defects, pits, and holes in the tubular 170. For tubulars 190, the sensors 112 may be placed in proximity to the outer surface of the tubular 190 to detect the variation of the magnetic field due to the possible existence of defects, pits, and holes in the tubular 190.

In certain cases, the inspection tool 110 may be communicatively coupled to the processing system 120 via a cable 140. The cable 140 may include one or more mechanical cables, electrical cables, and/or electro-optical cables that include one or more fiber-optic lines. Data (e.g., MFL measurements) related to the tubulars 170 and/or 190 gathered by the inspection tool 110 may be transmitted to the processing system 120 (via the cable 140) and/or stored in the database 134 for later processing and analysis.

The processing system 120 may obtain the MFL measurements from the inspection tool 110 as raw data. In certain embodiments, the MFL measurements are processed or pre-processed by the inspection tool 110 before being sent to the processing system 120. Processing of the MFL measurements may incorporate using and/or obtaining other measurements, such as from ultrasonic, caliper, and/or other electromagnetic logging techniques to better constrain unknown parameters of the tubulars 170 or 190. The processing system 120 is generally configured to analyze the data obtained via the inspection tool 110 to determine the presence of one or more defects including one or more parameters of the defects, such as size, geometric shape, aspect ratio, among other parameters.

As shown, the processing system 120 includes, without limitation, a processor 122, a memory 124, a network interface 128, and a human machine interface (HMI) 130. The processor 122 represents any number of processing elements, which can include any number of processing cores. The memory 124 can include volatile memory, non-volatile memory, and combinations thereof. The memory 124 generally includes program code (e.g., MFL tool 126) for performing various techniques described herein for performing casing inspection and/or coiled tubing inspection, based on evaluating MFL measurements obtained via the inspection tool 110. The program code is generally described as various functional "components" or "modules" within the memory 124, although alternate implementations may have different functions or combinations of functions.

The network interface 128 may include circuitry for communicating over the network 150. For example, the network interface 128 may include interfaces for PAN, LAN, and/or WAN, as illustrative examples. The HMI 130 may include one or more input and/or output devices for enabling communication between the processor 122, the memory 124, the network interface 128, and one or more users. In certain embodiments, the HMI 130 includes one or more input devices, one or more output devices, or a combination thereof. For example, the HMI 130 may include a display and/or a keyboard, a mouse, a touch pad, or other input devices suitable for receiving inputs from a user. In certain embodiments, the HMI 130 includes a touch-screen display (e.g., touch screen liquid crystal display (LCD)), which may enable users to interact with a user interface of the processing system 120.

As noted, the MFL measurements obtained via the inspection tool 110 includes radial (or normal) components, axial components, and azimuthal components of magnetic fields detected by the sensor(s) 112 of the inspection tool 110. In certain embodiments, the processing system 120 (via the MFL tool 126) performs one or more filtering operations on the MFL measurements obtained via the inspection tool 110 to generate a set of MFL measurements associated with a reduced sensor liftoff with respect to the surface of the tubulars. By performing such filtering operations, embodiments can bring the measured fields closer to the surface of the tubulars for determining the presence of defects within the tubulars along with parameters of the defects. In this manner, embodiments described herein can significantly enhance the quality of images generated from the obtained MFL measurements (e.g., in terms of improved sharpness, improved contrast, reduce noise, higher dynamic range, among other parameters) compared to conventional MFL techniques.

Example Analytical Field Continuation and Extrapolation

In certain embodiments, the filtering operation incudes performing an analytical field continuation and extrapolation on the MFL measurements obtained via the inspection tool 110. Given the measured flux leakage data $f(\rho, \xi_0)$, where $\xi_0$ is the sensor liftoff and $\rho$ represents the spatial coordinates in the $y=\xi_0$ plane, certain embodiments described herein can obtain the magnetic field distribution f (p) at zero liftoff (y=0), since the measured data is of highest resolution when closest to the defects or corroded spots in the tubular (e.g., tubular 170 or 190). The responses at zero liftoff and at the measurement plane are related by the following convolution process:

$$f(\rho, \xi_0) = \int_{-\infty}^{\infty} d\rho' g(\rho - \rho', \xi_0) f(\rho'), \tag{1}$$

where the integral kernel $g(\rho-\rho', \xi_0)$ of the convolution is given as $$g(\rho - \rho', \xi_0) = \frac{1}{2\pi} \frac{|\xi_0|}{\left(|\rho - \rho'|^2 + \xi_0^2\right)^{3/2}}. \tag{2}$$

To determine $f(\rho)$ from $f(\rho, \xi_0)$, which may be corrupted by measurement noise, a Fourier transform can be performed on Equation (1) with respect to $\rho$ to obtain:

$$F(k_x, k_z, \xi_0) = G(k_x, k_z, \xi_0) F(k_x, k_z), \tag{3a}$$

or $$F(k_x, k_z) = F(k_x, k_z, \xi_0) / G(k_x, k_z, \xi_0). \tag{3b}$$

Applying the inverse Fourier transform to calculate $f(\rho)$ is a highly unstable process since the deconvolution filter given by $$1/G(k_x, k_z, \xi_0) = e^{\kappa|\xi_0|}, \tag{4}$$

where $$\kappa = \sqrt{k_x^2 + k_z^2},$$

is a growing exponential. In other words, using the inverse of $G(k_x, k_z, \xi_0)$ to back-propagate the field from the measurement plane to the tubular surface would be exponentially growing, leading to an ill-posed and very unstable process due to the inevitable presence of measurement noise.

While the inversion of the integral kernel filter is not stable, forward propagating the data away from the measurement plane has the exact opposite effect and can be exploited to suppress the noise in the measured data. This can be done by first analytically continuing the measured field $f(p, \xi_0)$ to outer plane locations of larger liftoff values $\xi_i (\xi_i > \xi_0, i=1, 2, \ldots, N)$:

$$f(\rho, \xi_i) = \int_{-\infty}^{\infty} d\rho' \, g(\rho - \rho', \xi_i - \xi_0) f(\rho', \xi_0). \quad (5)$$

The analytical forward continuation of the data, per Equation (5), away from the sources (defects) may be referred to as outward continuation. See Braunisch, H., and Habashy, T., 1999, Deblurring by a local extrapolation scheme, Inverse Problem, 15, 1263-1281. Outward continuation involves a numerical integration of the data and has the effect of smoothing out the data and hence suppressing the high spatial frequency components-mostly the noise in the data.

Figure 2:
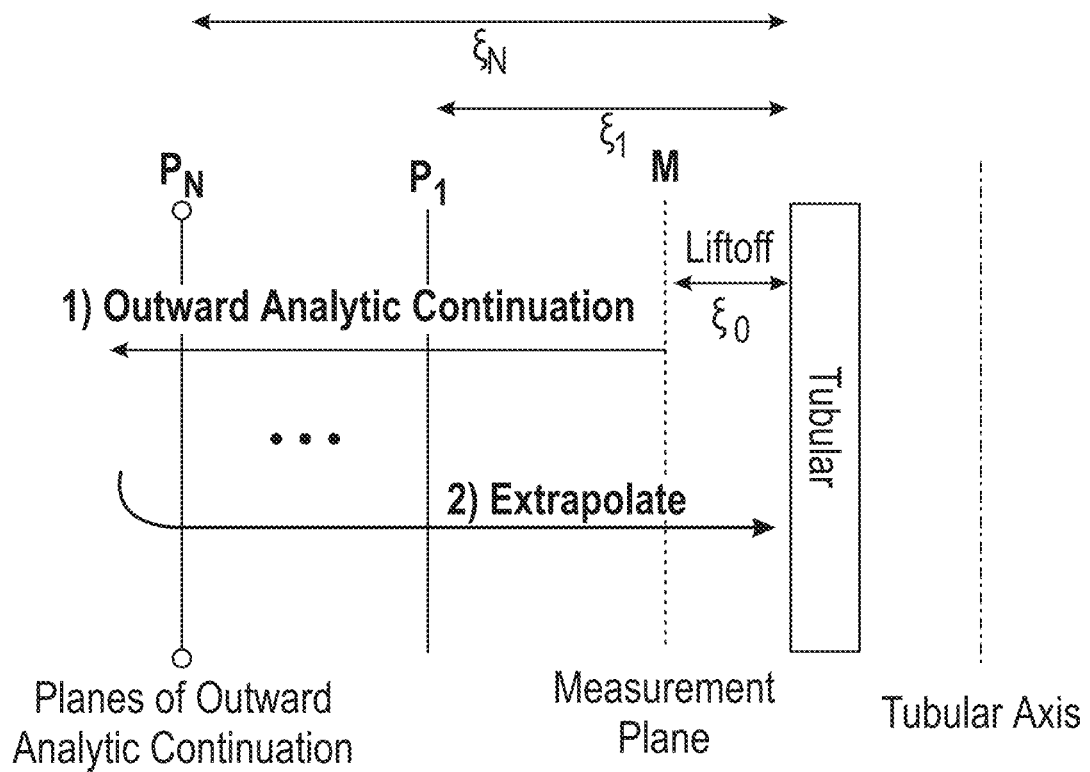
FIG. 2 illustrates an example analytical continuation technique for filtering MFL measurements, according to certain embodiments.

The analytical continuation approach is illustrated in FIG. 2. In the first step, the data is continued analytically outwards from the measurement plane (M) to the planes $P_1, \ldots, P_N$. In the second step, extrapolation is performed backward from the planes $P_N, \ldots, P_1$ to the tubular surface. With the multiple outward-continued data sets, embodiments described herein may extrapolate the magnetic field back to where the sources are assumed to reside by using, for example, a linear or a polynomial extrapolation scheme. Notice that, with this technique, it is not necessary to know the exact liftoff to perform the image processing described herein. A proper liftoff value may be estimated through approximation, trial and error, or through an independent measurement.

Example Data Filtering Through Regularized Deconvolution

In certain embodiments, the filtering operation incudes applying a regularized deconvolution filter to the MFL measurements obtained via the inspection tool 110. Certain conventional techniques for circumventing the difficulty associated with the exponentially growing deconvolution filter involves implementing a built-in safeguard against division by exponentially small numbers. A robust and stable deconvolution inversion filter for the MFL data can be derived by minimizing the following cost function:

$$C[F(\omega)] = \mu \left[ \int_{-\infty}^{\infty} d\omega |G(\omega, \xi_0) F(\omega) - F(\omega, \xi_0)|^2 - N \right] + \int_{-\infty}^{\infty} d\omega |F(\omega)|^2, \quad (6)$$

where the scalar factor $\mu$ ($\mu > 0$) is a Lagrangian multiplier which represents a trade-off parameter determining the relative importance of the data misfit and the regularization term, and N is the spectral noise associated with the data $F(\omega, \xi_0)$. Note, for the sake of clarity, $\omega$ is used to represent $k_x$ and $k_z$. The minimum of the cost function is achieved if $$F(\omega) = \frac{G^*(\omega, \xi_0)}{\lambda + |G(\omega, \xi_0)|^2} F(\omega, \xi_0), \quad (7)$$

where the superscript * indicates conjugation and the selection of $\lambda = 1/\mu$ depends on the data noise level and sensor liftoff value. Thus, the deconvolution filter is given as $$\Gamma(\omega) = \frac{G^*(\omega, \xi_0)}{\lambda + |G(\omega, \xi_0)|^2}. \quad (8)$$

Compared with Equation (4), the deconvolution filter in Equation (8) includes a non-zero regularization constant $\lambda$ which stabilizes the deconvolution process.

Figure 3A:
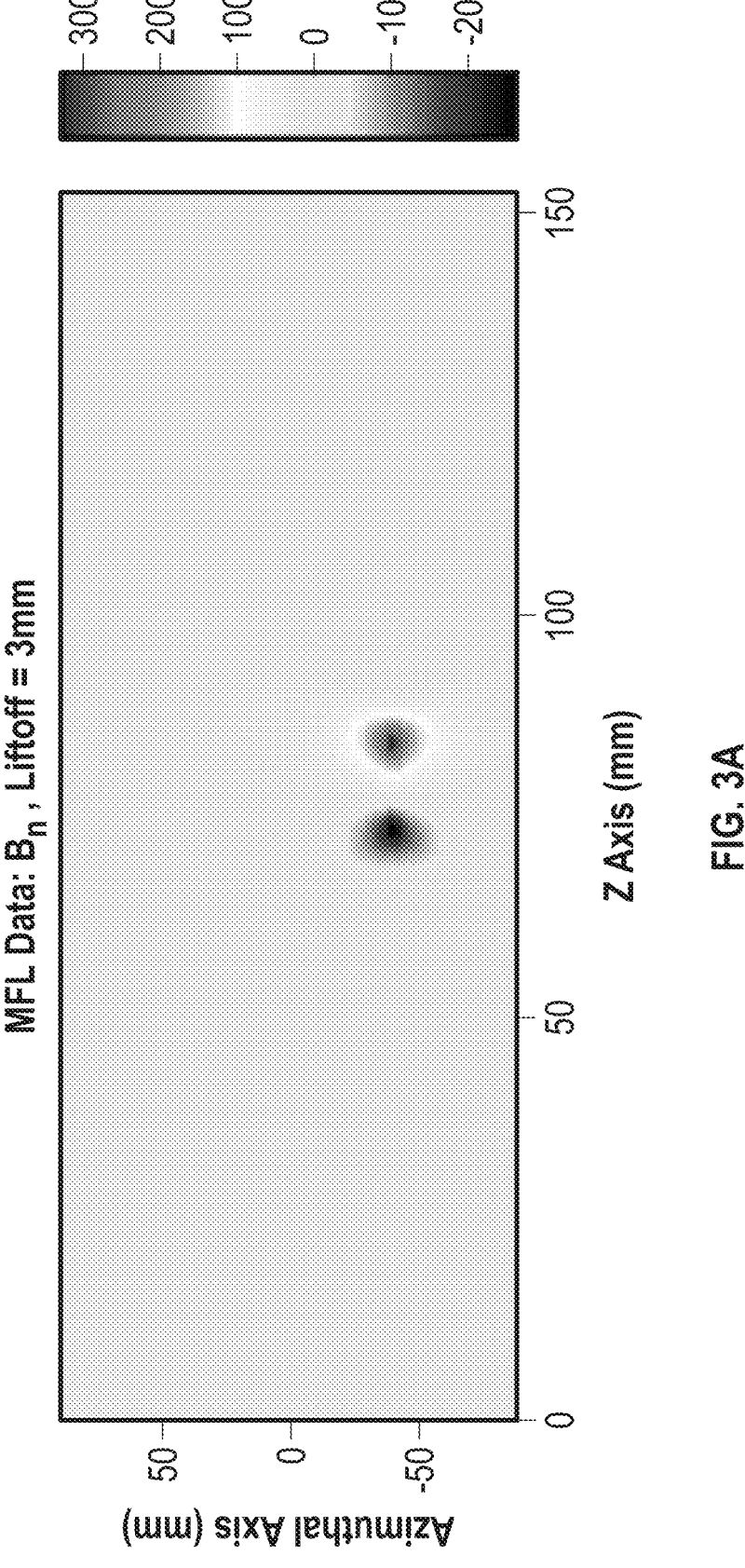
FIG. 3A illustrates example measured MFL data for a defect on a surface of coiled tubing, according to certain embodiments.
Figure 3B:
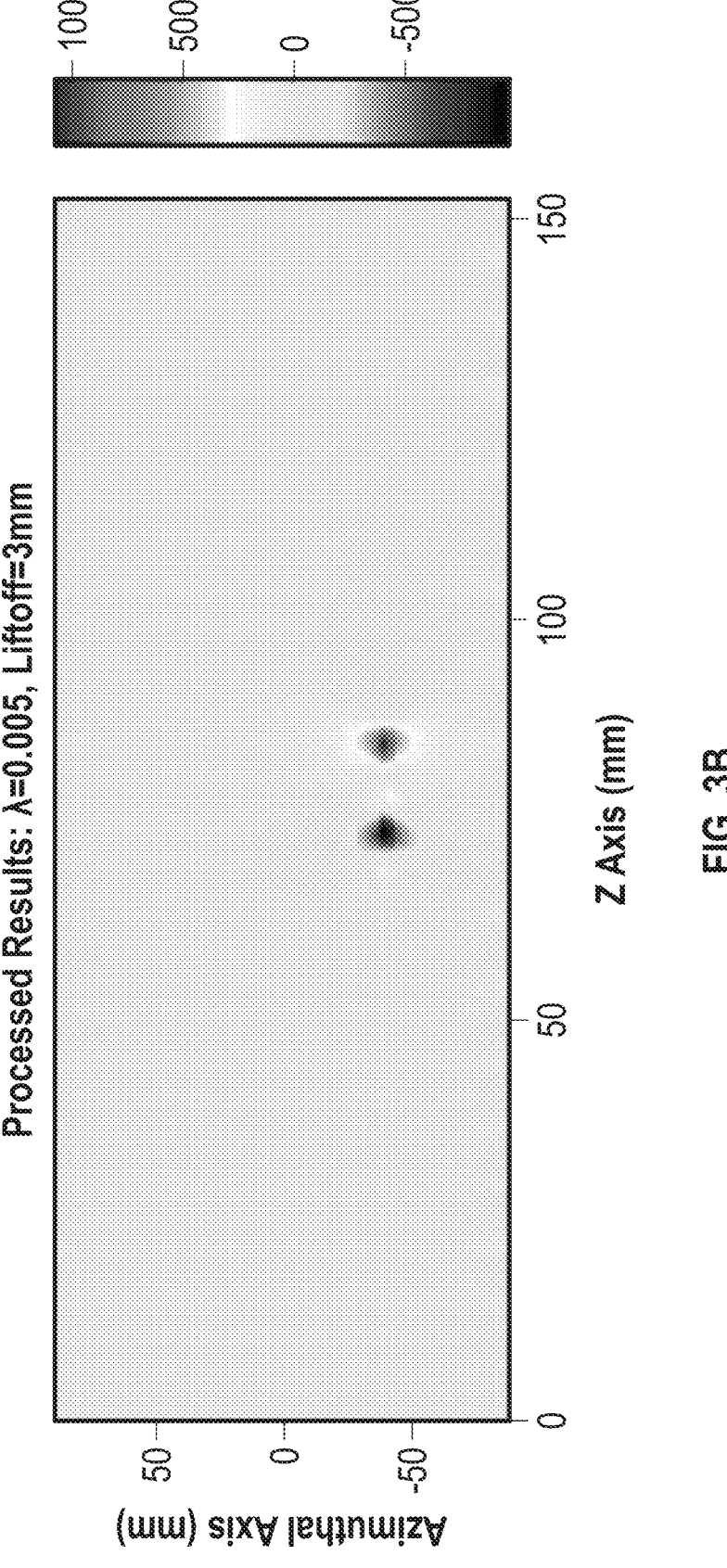
FIGS. 3B-3D illustrate example processed results of the measured data in FIG. 3A, according to certain embodiments.
Figure 3C:
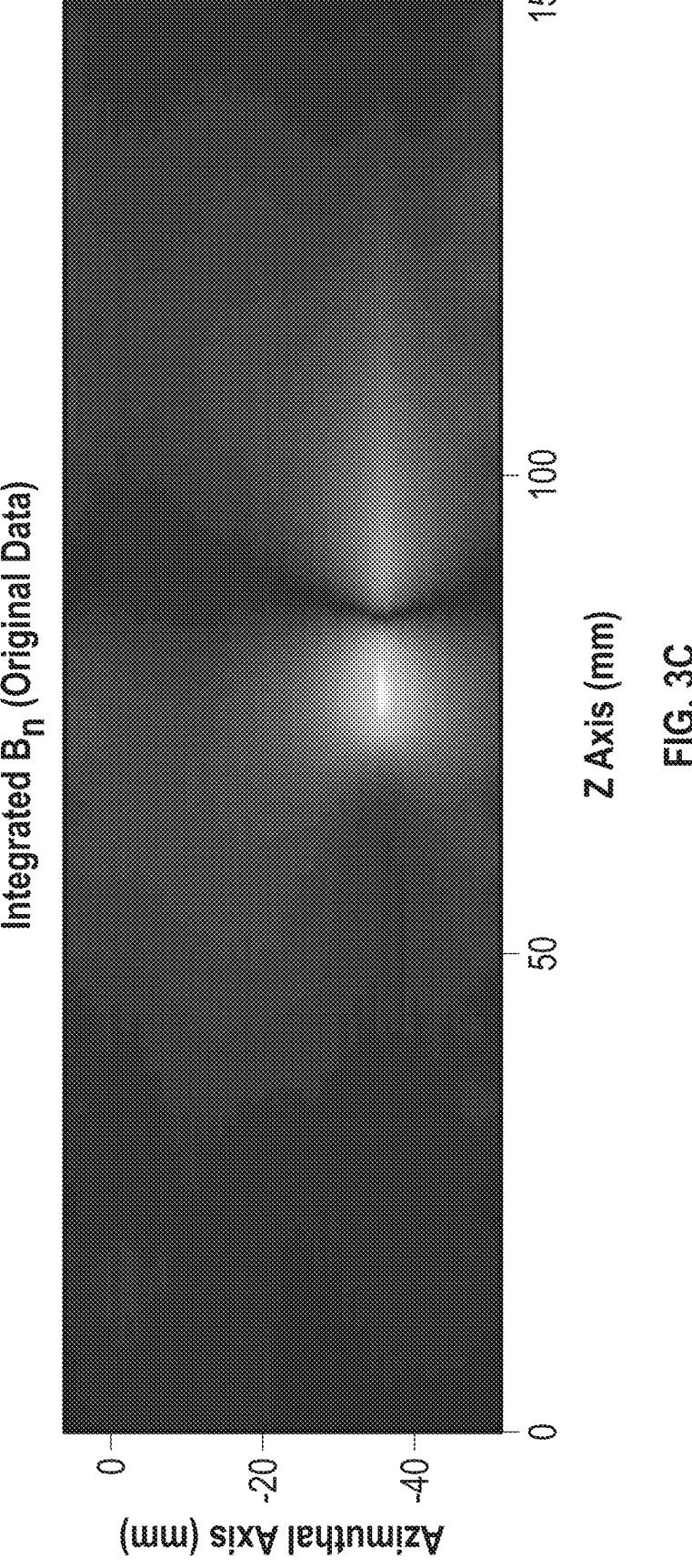
Figure 3D:
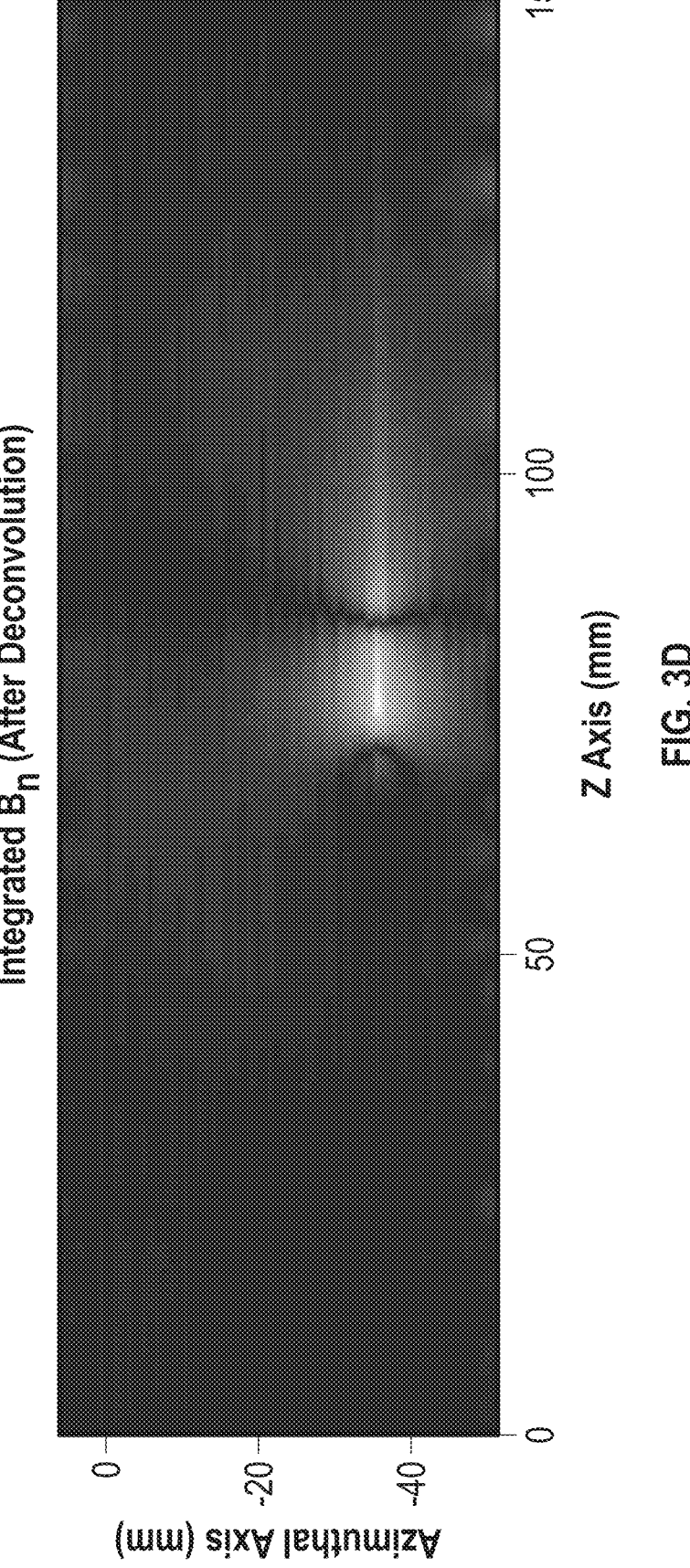

FIG. 3A illustrates measured data of a rectangular defect on the surface of coiled tubing (e.g., tubular 190), and FIGS. 3B-3D illustrate different processed results of the measured data in FIG. 3A, according to certain embodiments. Here, the rectangular defect may have a length of 10.2 millimeters (mm), a width of 2 mm, and a depth of 2.29 mm carved on the surface of a coiled tubing with an outer diameter of 50.8 mm and a wall thickness of 3.28 mm.

The acquired normal magnetic field for a sensor liftoff approximately equal to 3 mm is shown in FIG. 3A. Here, the rectangular defect gives rise to strong leaked normal magnetic fields around its two end points in the axial direction with a negative field value at one end and a positive value at the other. The data in FIG. 3A may be contaminated by noise and the raw image does not show a clear signature of the rectangular defect because of the influence of liftoff. In certain embodiments, the regularized deconvolution filter according to Equation (8) is applied to the data shown in FIG. 3A and the refined result is shown in FIG. 3B. As shown in FIG. 3B, the image of the normal field becomes more focused due to removal (or at least reduction) of the effect of the 3-mm liftoff, bring the measured field closer to the defect.

In certain embodiments described, the filtering operation may involve integrating the radial field component of the MFL data or a processed version of the MFL data along an axial direction. By integrating the radial field component of the MFL data (or processed version of the MFL data) along the axial direction, embodiments can significantly enhance the quality of the image of the defect. By way of example, FIG. 3C shows the result of applying numerical integration in the axial direction to the data in FIG. 3A, and FIG. 3D shows the result of applying numerical integration in the axial direction to the data in FIG. 3B. As shown in FIGS. 3C and 3D, the images better reflect the shape of the rectangular defect compared to the images in FIGS. 3A and 3B, respectively.

Figure 4A:
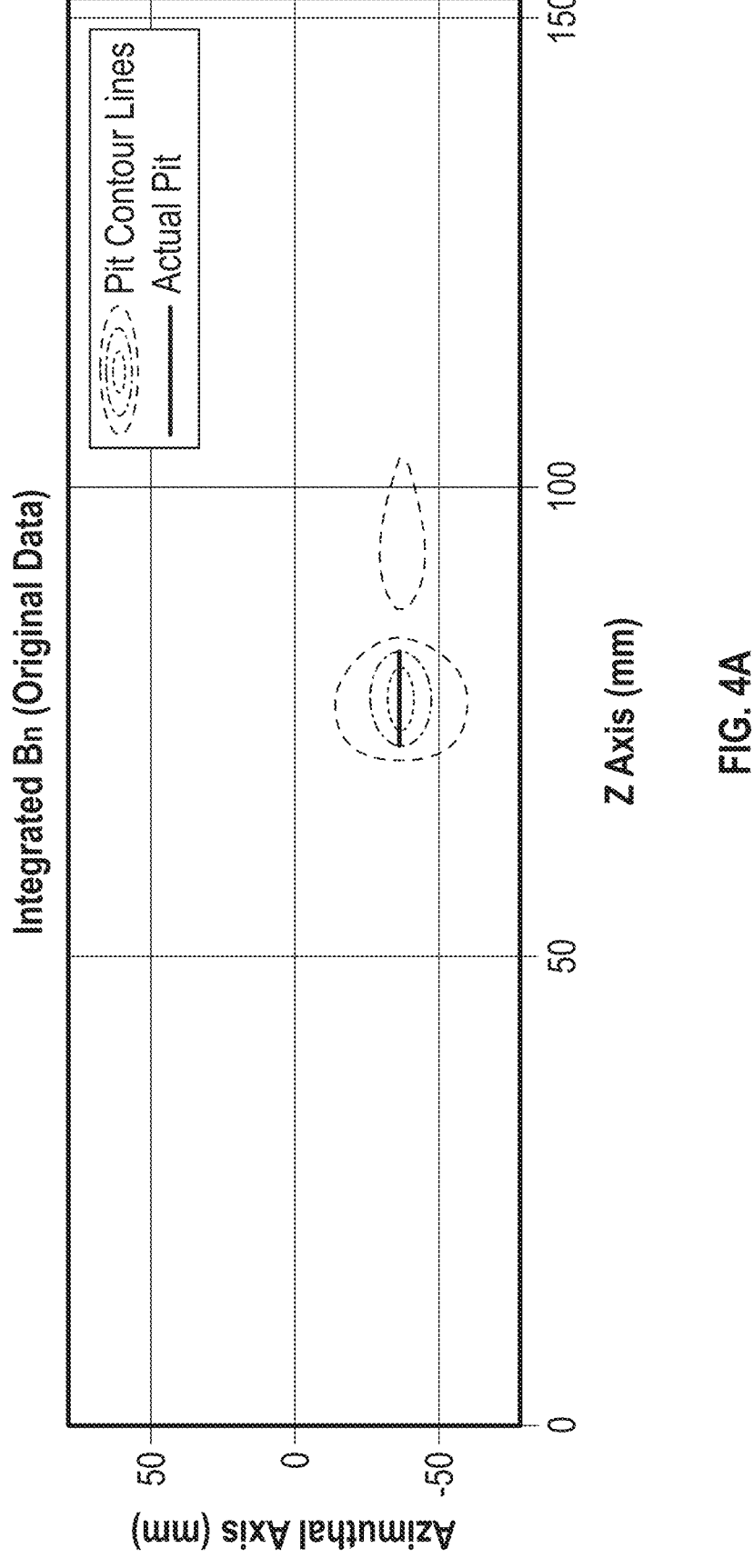
FIG. 4A illustrates an example contour line plot of integrated normal magnetic fields without regularized deconvolution processing, according to certain embodiments.
Figure 4B:
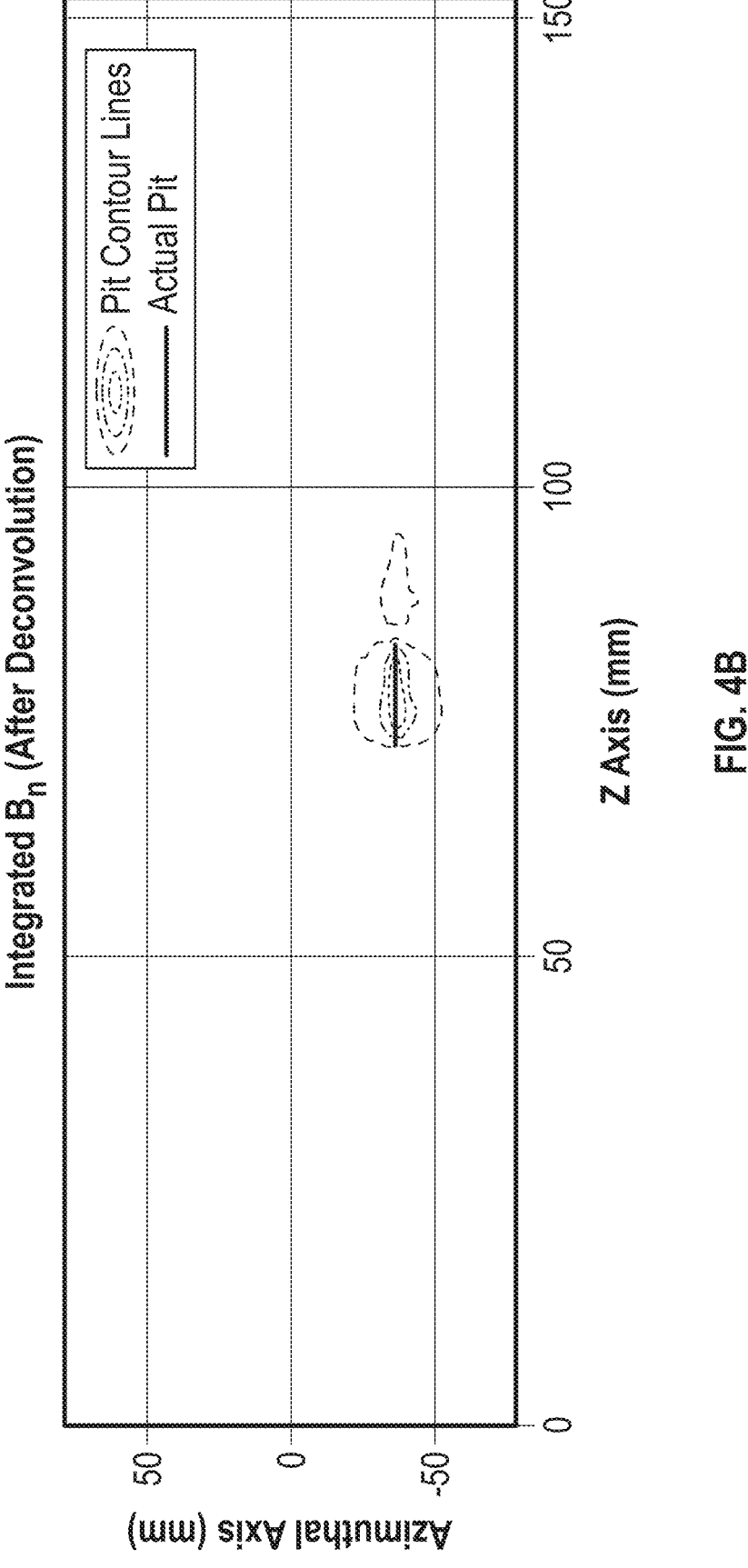
FIG. 4B illustrates an example contour line plot of integrated normal magnetic fields with regularized deconvolution processing, according to certain embodiments.
Figure 4C:
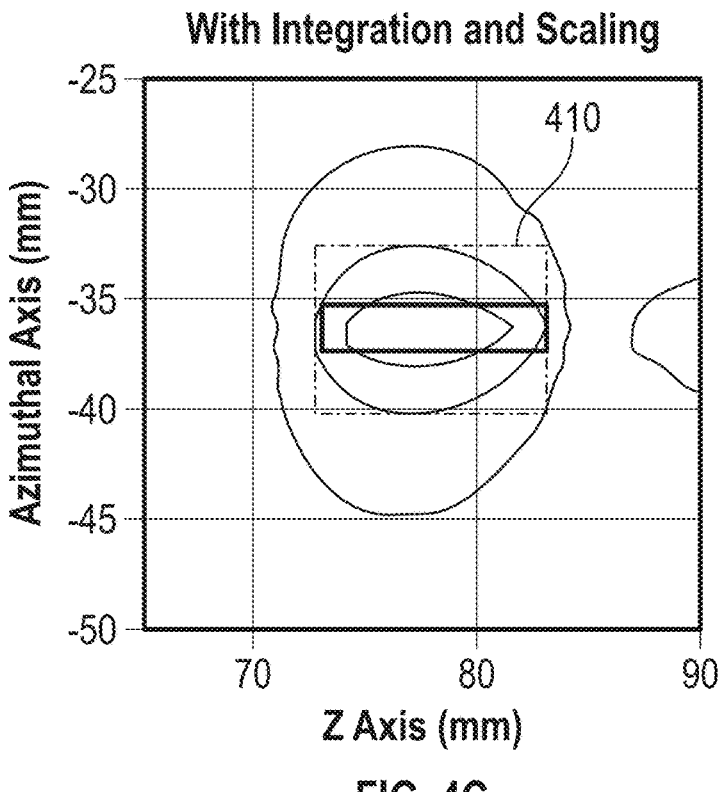
FIG. 4C illustrates an example image of a defect after application of an ad-hoc localized scaling coefficient to the contour line plot illustrated in FIG. 4A, according to certain embodiments.
Figure 4D:
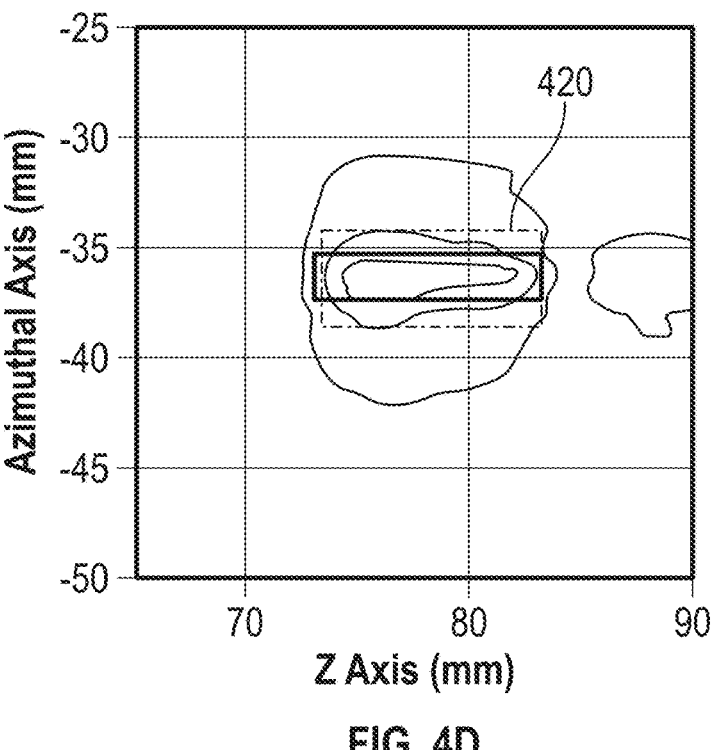
FIG. 4D illustrates an example image of a defect after application of an ad-hoc localized scaling coefficient to the contour line plot illustrated in FIG. 4B, according to certain embodiments.

In certain embodiments described herein, the filtering operation involves applying ad hoc localized scaling to the MFL data or a processed version of the MFL data, e.g., using a predefined scaling coefficient. In certain embodiments, the predefined scaling coefficient may have a value less than 1. By performing ad-hoc scaling of the MFL data (or processed version of the MFL data), embodiments can significantly improve the quality of the images, such that the aspect ratio and/or geometric shapes of the images better reflect the aspect ratio and/or geometric shapes of the defects. By way of example, FIGS. 4A and 4B depict contour line plots of integrated normal magnetic fields without and with regularized deconvolution processing, respectively, according to certain embodiments. In FIGS. 4A and 4B, the values of the contour lines are at 75%, 50%, and 25% of the maximum field strength. FIGS. 4C and 4D show the magnified defect area after an ad hoc localized scaling coefficient was further applied to the integrated normal magnetic field in FIG. 4A and FIG. 4B, respectively.

In FIGS. 4C and 4D, the interpreted defect areas by the MFL tool 126 are plotted with contour lines based on the intensity of the integrated normal field. In FIG. 4C, the contour region 410 is derived from the 50% of the maximum field intensity value and encloses the most severely defected area. Similarly, in FIG. 4D, the contour region 420 is derived from the 50% of the maximum field intensity value and encloses the most severely defected area. As shown in FIGS. 4C and 4D, the location and the shape of the most severely defected area agree well with the location and shape of the actual defect. For example, the aspect ratio of the defect derived with the deconvolved data agrees better with the aspect ratio of the actual defect. In other words, the regularized deconvolution processing improves the shape reconstruction of the defects, thereby improving evaluation of the integrity of the coiled tubing.

FIG. 5 illustrates a table 500 of processed results for a list of acquired normal field datasets for various sized rectangular defects and a circular shaped pit created on different sized coiled tubing, according to certain embodiments. The column 502 in table 500 indicates the maximum amplitudes of the leaked normal field after integration processing. These numbers reflect the significance of the defects. The actual depths of the defects are indicated in column 504 of table 500. The interpreted defect lengths and widths indicated in column 506 and 508, respectively, are derived from the fully processed data with the regularized deconvolution, the axial integration, and the azimuthal scaling with an ad hoc constant. Each column 506 and 508 also indicates the actual length and width of the defects for comparison purpose.

The aspect ratio for the defects is generally defined as the ratio between the defect length and defect width. The aspect ratio 1 in column 510 indicates the interpreted aspect ratio value for each of the defects from the integrated data without regularized deconvolution processing. The aspect ratio 2 in column 512 indicates the interpreted aspect ratio value for each of the defects from the integrated data with regularized deconvolution processing. As reflected in column 512, the defect aspect ratio numbers derived from the data with the regularized deconvolution processing generally agree better with the true values compared to the defect aspect ratio numbers derived from the data without the regularized deconvolution processing. That is, the interpreted aspect ratio numbers in column 512 are seen to generally follow the trend of the actual defects. Note that the interpreted lengths and widths are much larger than the actual numbers especially when they are small. This may be either due to the limited resolution of the MFL tool for lack of sensor density or due to tool physics being unable to resolve fine details.

Figure 6:
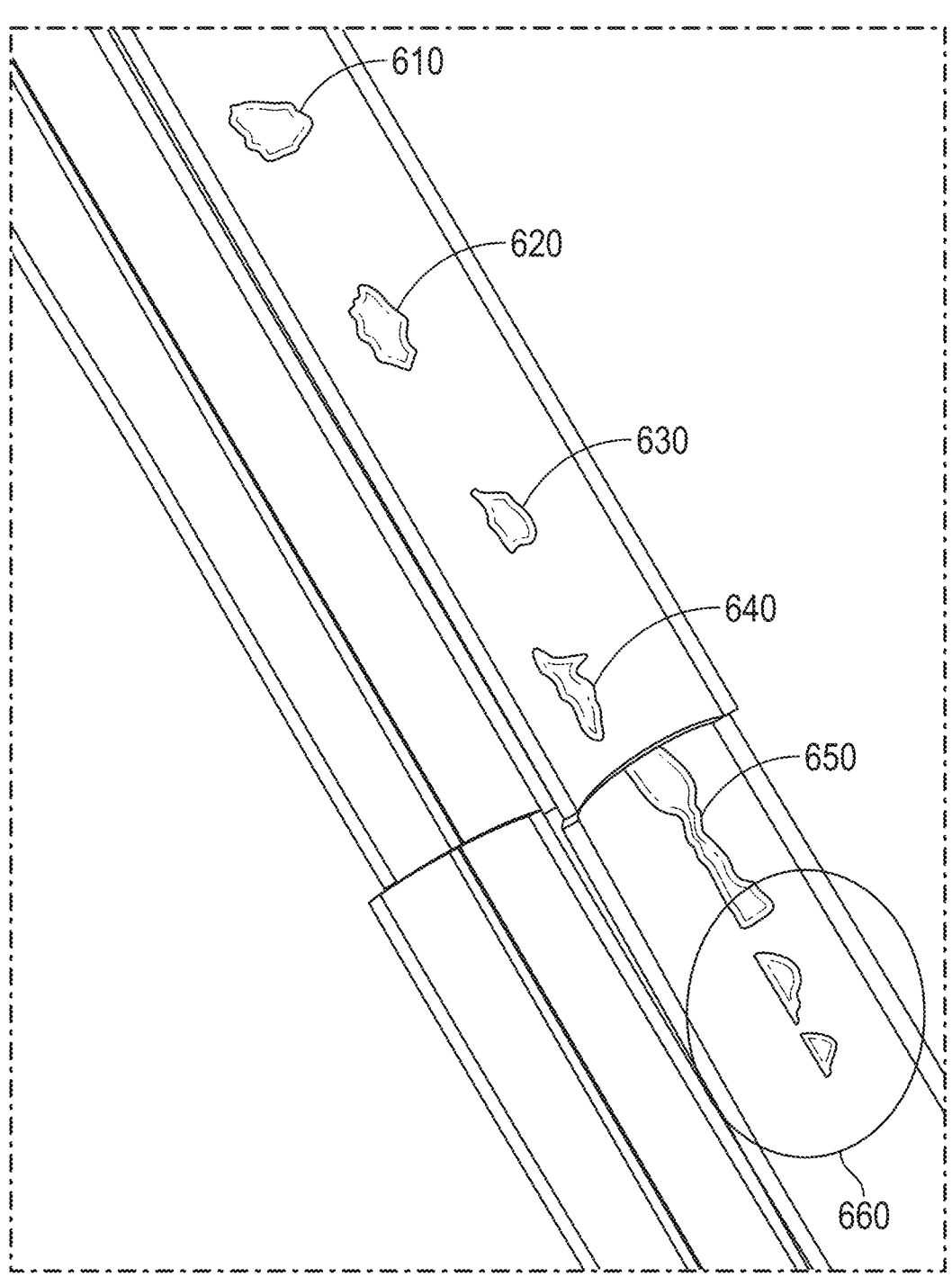
FIG. 6 illustrates a section of corroded coiled tubing, according to certain embodiments.
Figures 7A, 7B:
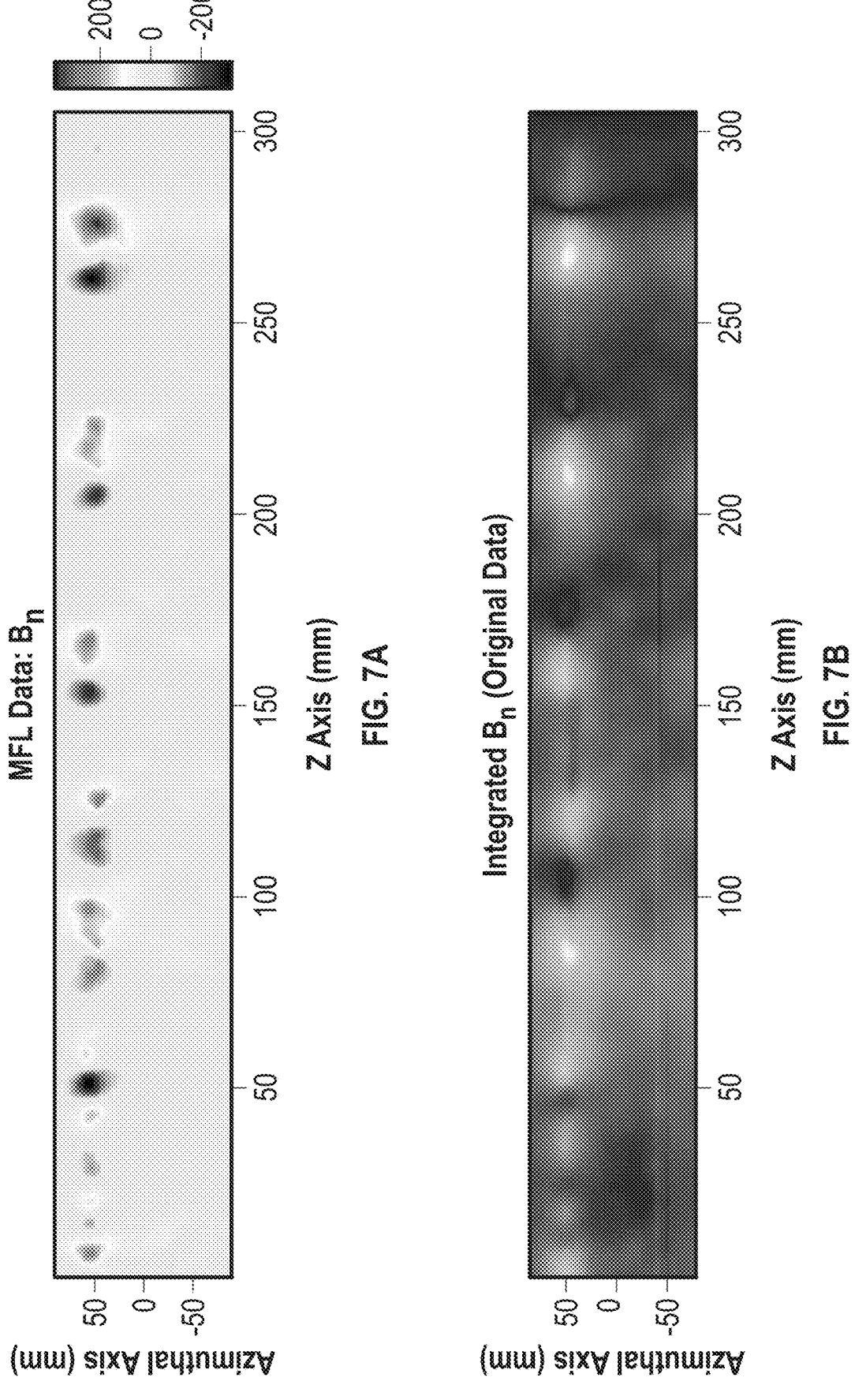
FIG. 7A illustrates an MFL image log obtained from an inspection of the corroded coiled tubing illustrated in FIG. 6, according to certain embodiments.
FIG. 7B illustrates an example result of applying numerical integration in the axial direction to the data in FIG. 7A, according to certain embodiments.
Figure 7C:
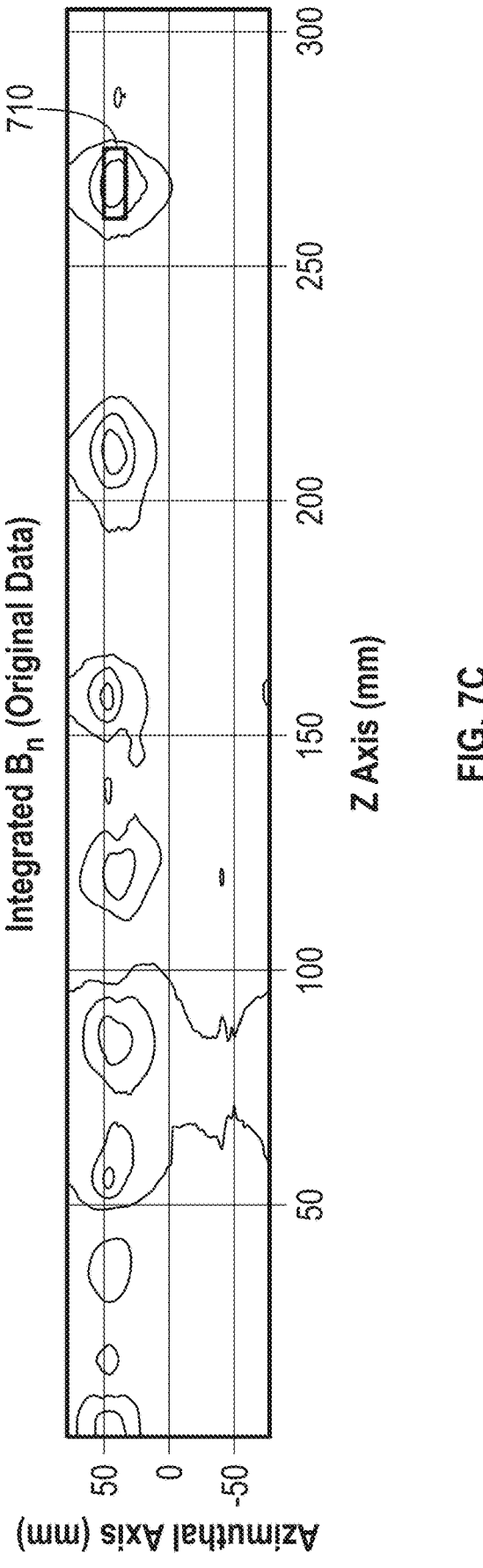
FIG. 7C illustrates contour line plots of the integrated normal magnetic fields illustrated in FIG. 7A without regularized deconvolution processing, according to certain embodiments.

FIG. 6 illustrates a section of corroded coiled tubing (e.g., tubular 190) that has been cut open, according to certain embodiments. In particular, FIG. 6 shows the inner side of the coiled tubing has been corroded and includes defects 610, 620, 630, 640, 650, and 660. FIG. 7A depicts an original MFL image log obtained via the inspection tool 110 after an inspection of the corroded coiled tubing depicted in FIG. 6. FIG. 7B shows the result of applying numerical integration in the axial direction to the data in FIG. 7A, and FIG. 7C shows the contour line plots of the integrated normal magnetic fields depicted in FIG. 7A without regularized deconvolution processing. In FIG. 7C, the values of the contour lines plotted are at 75%, 50%, and 25% of the maximum field strength after the axial integration. As shown, the processed image in FIG. 7B and the contour plot lines in FIG. 7C show improved agreement with the corroded defects shown in FIG. 6. The contour region 710 depicted in FIG. 7C is derived from 50% of the maximum field intensity value and delineates the most significant defect after an ad-hoc localized scaling coefficient was further applied to the integrated normal field in the azimuthal direction. The sides of the contour region 710 indicate the length and width of the defect. Based on the values of the length and width of the contour region 710, the aspect ratio of the largest defect is 0.90.

In certain cases, performing axial integration may be difficult when the window of the segmented data cuts through defects. One approach to prevent segmenting data through defects involves avoiding integrating the field from the side where the defects are cut. However, this approach may be inefficient since it relies on user input. To address this, certain embodiments described herein provide techniques for calibrating integrated MFL data to remove the effects of possible broken defects due to data segmentation performed in the integration processing. The calibration technique described herein may involve determining one or more reference MFL measurements and, for each reference MFL measurement that is non-zero, subtracting the reference MFL measurement from the integrated MFL data.

For example, the calibration technique described herein identifies an axial point in the segmented data that is free of any influence by defects. Such axial point(s) may be identified based on the field amplitudes. The axially integrated field at that data point may be defined as the baseline values for the axially integrate field. By default, these baselines values should be zeros, assuming no defects were cut at the starting point of the segmented data. On the other hand, non-zero baseline values may be due to defects being cut at the starting point of the segmented data. Accordingly, the effect of the broken defects may be removed (or at least reduced) by subtracting these baselines values from the integrated field.

Figures 8A, 8B:
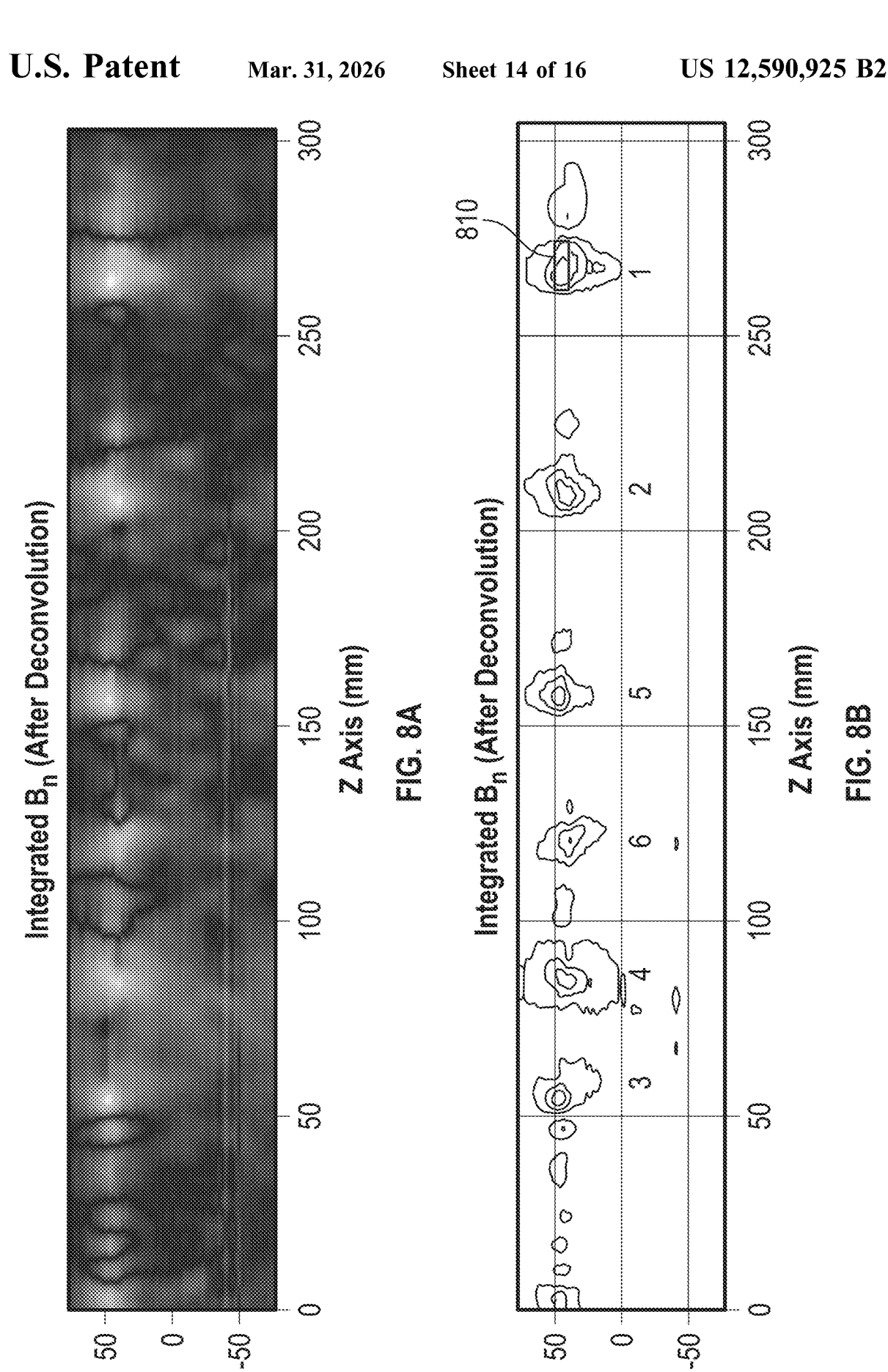
FIG. 8A illustrates an example result of applying regularized deconvolution filtering and numerical integration in the axial direction to the data in FIG. 7A, according to certain embodiments.
FIG. 8B illustrates contour line plots of defects after applying regularized deconvolution filtering and numerical integration in the axial direction to the data in FIG. 7A, according to certain embodiments.

FIG. 8A shows the result of applying regularized deconvolution filtering and numerical integration in the axial direction to the data in FIG. 7A. FIG. 8B shows the contour line plots of the defects after applying regularized deconvolution filtering and numerical integration in the axial direction to the data in FIG. 7A. In FIG. 8B, the contour region 810 is derived from 50% of the maximum field intensity value and delineates the most significant defect after an ad hoc localized scaling coefficient was further applied to the integrated normal field in the azimuthal direction. The interpreted aspect ratio of the most significant defect is 1.09. FIG. 9 illustrates a table 900 indicating the corresponding indices of the identified defects in FIG. 8B, the interpreted locations, the peak field values, and the interpreted aspect ratios.

Example Operations

FIG. 10 is a flow diagram depicting an example operations 1000 for MFL testing for casing inspection and coiled tubing inspection, according to certain embodiments. The operations 1000 may be performed, for example, by a processing system (e.g., processing system 120).

The operations 1000 may involve, at block 1002, operating an inspection tool (e.g., inspection tool 110), which includes at least one sensor (e.g., sensor(s) 112) arranged in proximity to at least one tubular (e.g., tubular(s) 170 or tubular(s) 190).

The operations 1000 may also involve, at block 1004, obtaining, using the inspection tool, a first set of MFL measurements associated with a first liftoff distance of the at least one sensor with respect to a surface of the at least one tubular.

The operations 1000 may also involve, at block 1006, generating a second set of MFL measurements associated with a second liftoff distance of the at least one sensor with respect to the surface of the at least one tubular, based on performing a filtering operation on the first set of MFL measurements. The second liftoff distance may be less than the first liftoff distance.

The operations 1000 may further involve, at block 1008, determining at least one defect of the at least one tubular, based on the second set of MFL measurements.

In certain embodiments, performing the filtering operation includes: (i) determining a plurality of outward-continued sets of MFL measurements based on the first set of MFL measurements, each outward-continued set of MFL measurements being associated with a respective outward-continued liftoff distance of the at least one sensor with respect to the surface of the at least one tubular; (ii) determining an estimated set of MFL measurements at the second liftoff distance, based on performing an extrapolation from the plurality of outward-continued sets of MFL measurements; and (iii) using the estimated set of MFL measurements as the second set of MFL measurements. In some such embodiments, each respective outward-continued liftoff distance may be greater than the first liftoff distance.

In certain embodiments, performing the filtering operation includes applying a regularized deconvolution filter to the first set of MFL measurements to generate a deconvolved set of MFL measurements, the second set of MFL measurements comprising the deconvolved set of MFL measurements.

In certain embodiments, performing the filtering operation may also include: applying a regularized deconvolution filter to the first set of MFL measurements to generate a deconvolved set of MFL measurements; and integrating at least one of (i) a radial field component of the deconvolved set of MFL measurements along an axial direction with respect to the surface of the at least one tubular or (ii) an azimuthal field component of the deconvolved set of MFL measurements along the axial direction, the second set of MFL measurements comprising at least one of the integrated radial field component or the integrated azimuthal field component of the deconvolved set of MFL measurements. In some such embodiments, performing the filtering operation may further include scaling the second set of MFL measurements comprising the at least one of the integrated radial field component or the integrated azimuthal field component, according to a predefined scaling parameter.

In certain embodiments, performing the filtering operation may include scaling the first set of MFL measurements according to a predefined scaling parameter to generate the second set of MFL measurements.

In certain embodiments, performing the filtering operation may include: integrating at least one of a (i) a radial field component of the first set of MFL measurements along an axial direction with respect to the surface of the at least one tubular or (ii) an azimuthal field component of the first set of MFL measurements along the axial direction to generate an integrated set of MFL measurements; and calibrating the integrated set of MFL measurements based on one or more reference MFL measurements, the second set of MFL measurements comprising the calibrated set of MFL measurements. In some such embodiments, calibrating the integrated set of MFL measurements may include, for each reference MFL measurement that is non-zero, subtracting the reference MFL measurement from the integrated set of MFL measurements.

In certain embodiments, the at least one tubular includes coiled tubing.

In certain embodiments, the at least one tubular includes a well casing.

In certain embodiments, the second liftoff distance may be zero.

In certain embodiments, the operations 1000 may further include generating an image of the at least one defect based on the second set of MFL measurements. The image may indicate at least one of a size or a shape of the at least one defect.

Example Clauses

Implementation examples are described in the following numbered clauses:

Clause 1: A method comprising: operating an inspection tool comprising at least one sensor arranged in proximity to a coiled tubing; obtaining, using the inspection tool, a first set of magnetic flux leakage (MFL) measurements associated with a first liftoff distance of the at least one sensor with respect to a surface of the coiled tubing; generating a second set of MFL measurements associated with a second liftoff distance of the at least one sensor with respect to the surface of the coiled tubing, based on performing a filtering operation on the first set of MFL measurements, the second liftoff distance being less than the first liftoff distance; and determining at least one defect of the coiled tubing, based on the second set of MFL measurements.

Clause 2: The method of Clause 1, wherein performing the filtering operation comprises: determining a plurality of outward-continued sets of MFL measurements based on the first set of MFL measurements, each outward-continued set of MFL measurements being associated with a respective outward-continued liftoff distance of the at least one sensor with respect to the surface of the coiled tubing; determining an estimated set of MFL measurements at the second liftoff distance, based on performing an extrapolation from the plurality of outward-continued sets of MFL measurements; and using the estimated set of MFL measurements as the second set of MFL measurements.

Clause 3: The method of Clause 2, wherein each respective outward-continued liftoff distance is greater than the first liftoff distance.

Clause 4: The method of Clause 1, wherein performing the filtering operation comprises applying a regularized deconvolution filter to the first set of MFL measurements to generate a deconvolved set of MFL measurements, the second set of MFL measurements comprising the deconvolved set of MFL measurements.

Clause 5: The method of Clause 1, wherein performing the filtering operation comprises: applying a regularized deconvolution filter to the first set of MFL measurements to generate a deconvolved set of MFL measurements; and integrating at least one of (i) a radial field component of the deconvolved set of MFL measurements along an axial direction with respect to the surface of the coiled tubing or (ii) an azimuthal field component of the deconvolved set of MFL measurements along the axial direction, the second set of MFL measurements comprising at least one of the integrated radial field component or the integrated azimuthal field component of the deconvolved set of MFL measurements.

Clause 6: The method of Clause 5, wherein performing the filtering operation further comprises scaling the second set of MFL measurements comprising the at least one of the integrated radial field component or the integrated azimuthal field component, according to a predefined scaling parameter.

Clause 7: The method in accordance with any of Clauses 1-6, wherein performing the filtering operation comprises scaling the first set of MFL measurements according to a predefined scaling parameter to generate the second set of MFL measurements.

Clause 8: The method in accordance with any of Clauses 1-7, wherein performing the filtering operation comprises: integrating at least one of a (i) a radial field component of the first set of MFL measurements along an axial direction with respect to the surface of the coiled tubing or (ii) an azimuthal field component of the first set of MFL measurements along the axial direction to generate an integrated set of MFL measurements; and calibrating the integrated set of MFL measurements based on one or more reference MFL measurements, the second set of MFL measurements comprising the calibrated set of MFL measurements.

Clause 9: The method of Clause 8, wherein calibrating the integrated set of MFL measurements comprises, for each reference MFL measurement that is non-zero, subtracting the reference MFL measurement from the integrated set of MFL measurements.

Clause 10: The method in accordance with any of Clauses 1-9, wherein the second liftoff distance is zero.

Clause 11: The method in accordance with any of Clauses 1-9, further comprising generating an image of the at least one defect based on the second set of MFL measurements, wherein the image indicates at least one of a size or a shape of the at least one defect.

Clause 12: A system comprising: one or more memories collectively storing instructions; and one or more processors communicatively coupled to the one or more memories, the one or more processors being collectively configured to execute the instructions to cause the system to: operate an inspection tool comprising at least one sensor arranged in proximity to a coiled tubing; obtain, using the inspection tool, a first set of magnetic flux leakage (MFL) measurements associated with a first liftoff distance of the at least one sensor with respect to a surface of the coiled tubing; generate a second set of MFL measurements associated with a second liftoff distance of the at least one sensor with respect to the surface of the coiled tubing, based on performing a filtering operation on the first set of MFL measurements, the second liftoff distance being less than the first liftoff distance; and determine at least one defect of the coiled tubing, based on the second set of MFL measurements.

Clause 13: The system of Clause 12, wherein to perform the filtering operation, the one or more processors are collectively configured to execute the instructions to cause the system to: determine a plurality of outward-continued sets of MFL measurements based on the first set of MFL measurements, each outward-continued set of MFL measurements being associated with a respective outward-continued liftoff distance of the at least one sensor with respect to the surface of the coiled tubing; determine an estimated set of MFL measurements at the second liftoff distance, based on performing an extrapolation from the plurality of outward-continued sets of MFL measurements; and use the estimated set of MFL measurements as the second set of MFL measurements.

Clause 14: The system of Clause 12, wherein to perform the filtering operation, the one or more processors are collectively configured to execute the instructions to cause the system to apply a regularized deconvolution filter to the first set of MFL measurements to generate a deconvolved set of MFL measurements, the second set of MFL measurements comprising the deconvolved set of MFL measurements.

Clause 15: The system of Clause 12, wherein to perform the filtering operation, the one or more processors are collectively configured to execute the instructions to cause the system to: apply a regularized deconvolution filter to the first set of MFL measurements to generate a deconvolved set of MFL measurements; and integrate at least one of (i) a radial field component of the deconvolved set of MFL measurements along an axial direction with respect to the surface of the coiled tubing or (ii) an azimuthal field component of the deconvolved set of MFL measurements along the axial direction, the second set of MFL measurements comprising at least one of the integrated radial field component or the integrated azimuthal field component of the deconvolved set of MFL measurements.

Clause 16: The system of Clause 15, wherein to perform the filtering operation, the one or more processors are collectively configured to execute the instructions to cause the system to further scale the second set of MFL measurements comprising the at least one of the integrated radial field component or the integrated azimuthal field component, according to a predefined scaling parameter.

Clause 17: The system in accordance with any of Clauses 12-16, wherein to perform the filtering operation, the one or more processors are collectively configured to execute the instructions to cause the system to scale the first set of MFL measurements according to a predefined scaling parameter to generate the second set of MFL measurements.

Clause 18: The system in accordance with any of Clauses 12-17, wherein to perform the filtering operation, the one or more processors are collectively configured to execute the instructions to cause the system to: integrate at least one of a (i) a radial field component of the first set of MFL measurements along an axial direction with respect to the surface of the coiled tubing or (ii) an azimuthal field component of the first set of MFL measurements along the axial direction to generate an integrated set of MFL measurements; and calibrate the integrated set of MFL measurements based on one or more reference MFL measurements, the second set of MFL measurements comprising the calibrated set of MFL measurements.

Clause 19: The system of Clause 18, wherein to calibrate the integrated set of MFL measurements, the one or more processors are collectively configured to execute the instructions to cause the system to, for each reference MFL measurement that is non-zero, subtract the reference MFL measurement from the integrated set of MFL measurements.

Clause 20: A non-transitory computer-readable storage medium comprising computer-executable code, which when executed by one or more processors of a computing system, perform an operation comprising: operating an inspection tool comprising at least one sensor arranged in proximity to a coiled tubing; obtaining, using the inspection tool, a first set of magnetic flux leakage (MFL) measurements associated with a first liftoff distance of the at least one sensor with respect to a surface of the coiled tubing; generating a second set of MFL measurements associated with a second liftoff distance of the at least one sensor with respect to the surface of the coiled tubing, based on performing a filtering operation on the first set of MFL measurements, the second liftoff distance being less than the first liftoff distance; and determining at least one defect of the coiled tubing, based on the second set of MFL measurements.

Clause 21: A non-transitory computer-readable storage medium comprising computer-executable code, which when executed by one or more processors of a downhole telemetry module, perform a method in accordance with any of Clauses 1-11.

Clause 22: An apparatus comprising means for performing a method in accordance with any of Clauses 1-11.

Clause 23: An apparatus comprising: one or more memories collectively storing computer-executable instructions, and one or more processors coupled to the one or more memories, the one or more processors being collectively configured to execute the computer-executable instructions to cause the apparatus to perform a method in accordance with any of Clauses 1-11.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, "a processor," "at least one processor," or "one or more processors" generally refer to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refer to a single memory configured to store data and/or instructions or multiple memories configured to collectively store data and/or instructions.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an ASIC, or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method comprising:

operating an inspection tool comprising at least one sensor arranged in proximity to a coiled tubing;

obtaining, using the inspection tool, a first set of magnetic flux leakage (MFL) measurements associated with a first liftoff distance of the at least one sensor with respect to a surface of the coiled tubing;

generating a second set of MFL measurements associated with a second liftoff distance of the at least one sensor with respect to the surface of the coiled tubing, based on performing a filtering operation on the first set of MFL measurements, the second liftoff distance being less than the first liftoff distance; and determining at least one defect of the coiled tubing, based on the second set of MFL measurements.

2. The method of claim 1, wherein performing the filtering operation comprises:

determining a plurality of outward-continued sets of MFL measurements based on the first set of MFL measurements, each outward-continued set of MFL measurements being associated with a respective outward-continued liftoff distance of the at least one sensor with respect to the surface of the coiled tubing;

determining an estimated set of MFL measurements at the second liftoff distance, based on performing an extrapolation from the plurality of outward-continued sets of MFL measurements; and using the estimated set of MFL measurements as the second set of MFL measurements.

3. The method of claim 2, wherein each respective outward-continued liftoff distance is greater than the first liftoff distance.

4. The method of claim 1, wherein performing the filtering operation comprises applying a regularized deconvolution filter to the first set of MFL measurements to generate a deconvolved set of MFL measurements, the second set of MFL measurements comprising the deconvolved set of MFL measurements.

5. The method of claim 1, wherein performing the filtering operation comprises:

applying a regularized deconvolution filter to the first set of MFL measurements to generate a deconvolved set of MFL measurements; and integrating at least one of (i) a radial field component of the deconvolved set of MFL measurements along an axial direction with respect to the surface of the coiled tubing or (ii) an azimuthal field component of the deconvolved set of MFL measurements along the axial direction, the second set of MFL measurements comprising at least one of the integrated radial field component or the integrated azimuthal field component of the deconvolved set of MFL measurements.

6. The method of claim 5, wherein performing the filtering operation further comprises scaling the second set of MFL measurements comprising the at least one of the integrated radial field component or the integrated azimuthal field component, according to a predefined scaling parameter.

7. The method of claim 1, wherein performing the filtering operation comprises scaling the first set of MFL measurements according to a predefined scaling parameter to generate the second set of MFL measurements.

8. The method of claim 1, wherein performing the filtering operation comprises:

integrating at least one of a (i) a radial field component of the first set of MFL measurements along an axial direction with respect to the surface of the coiled tubing or (ii) an azimuthal field component of the first set of MFL measurements along the axial direction to generate an integrated set of MFL measurements; and calibrating the integrated set of MFL measurements based on one or more reference MFL measurements, the second set of MFL measurements comprising the calibrated set of MFL measurements.

9. The method of claim 8, wherein calibrating the integrated set of MFL measurements comprises, for each reference MFL measurement that is non-zero, subtracting the reference MFL measurement from the integrated set of MFL measurements.

10. The method of claim 1, wherein the second liftoff distance is zero.

11. The method of claim 1, further comprising generating an image of the at least one defect based on the second set of MFL measurements, wherein the image indicates at least one of a size or a shape of the at least one defect.

12. A system comprising:

one or more memories collectively storing instructions; and one or more processors communicatively coupled to the one or more memories, the one or more processors being collectively configured to execute the instructions to cause the system to:

operate an inspection tool comprising at least one sensor arranged in proximity to a coiled tubing;

obtain, using the inspection tool, a first set of magnetic flux leakage (MFL) measurements associated with a first liftoff distance of the at least one sensor with respect to a surface of the coiled tubing;

generate a second set of MFL measurements associated with a second liftoff distance of the at least one sensor with respect to the surface of the coiled tubing, based on performing a filtering operation on the first set of MFL measurements, the second liftoff distance being less than the first liftoff distance; and determine at least one defect of the coiled tubing, based on the second set of MFL measurements.

13. The system of claim 12, wherein to perform the filtering operation, the one or more processors are collectively configured to execute the instructions to cause the system to:

determine a plurality of outward-continued sets of MFL measurements based on the first set of MFL measurements, each outward-continued set of MFL measurements being associated with a respective outward-continued liftoff distance of the at least one sensor with respect to the surface of the coiled tubing;

determine an estimated set of MFL measurements at the second liftoff distance, based on performing an extrapolation from the plurality of outward-continued sets of MFL measurements; and use the estimated set of MFL measurements as the second set of MFL measurements.

14. The system of claim 12, wherein to perform the filtering operation, the one or more processors are collectively configured to execute the instructions to cause the system to apply a regularized deconvolution filter to the first set of MFL measurements to generate a deconvolved set of MFL measurements, the second set of MFL measurements comprising the deconvolved set of MFL measurements.

15. The system of claim 12, wherein to perform the filtering operation, the one or more processors are collectively configured to execute the instructions to cause the system to:

apply a regularized deconvolution filter to the first set of MFL measurements to generate a deconvolved set of MFL measurements; and integrate at least one of (i) a radial field component of the deconvolved set of MFL measurements along an axial direction with respect to the surface of the coiled tubing or (ii) an azimuthal field component of the deconvolved set of MFL measurements along the axial direction, the second set of MFL measurements comprising at least one of the integrated radial field component or the integrated azimuthal field component of the deconvolved set of MFL measurements.

16. The system of claim 15, wherein to perform the filtering operation, the one or more processors are collectively configured to execute the instructions to cause the system to further scale the second set of MFL measurements comprising the at least one of the integrated radial field component or the integrated azimuthal field component, according to a predefined scaling parameter.

17. The system of claim 12, wherein to perform the filtering operation, the one or more processors are collectively configured to execute the instructions to cause the system to scale the first set of MFL measurements according to a predefined scaling parameter to generate the second set of MFL measurements.

18. The system of claim 12, wherein to perform the filtering operation, the one or more processors are collectively configured to execute the instructions to cause the system to:

integrate at least one of a (i) a radial field component of the first set of MFL measurements along an axial direction with respect to the surface of the coiled tubing or (ii) an azimuthal field component of the first set of MFL measurements along the axial direction to generate an integrated set of MFL measurements; and calibrate the integrated set of MFL measurements based on one or more reference MFL measurements, the second set of MFL measurements comprising the calibrated set of MFL measurements.

19. The system of claim 18, wherein to calibrate the integrated set of MFL measurements, the one or more processors are collectively configured to execute the instructions to cause the system to, for each reference MFL measurement that is non-zero, subtract the reference MFL measurement from the integrated set of MFL measurements.

20. A non-transitory computer-readable storage medium comprising computer-executable code, which when executed by one or more processors of a computing system, perform an operation comprising:

operating an inspection tool comprising at least one sensor arranged in proximity to a coiled tubing;

obtaining, using the inspection tool, a first set of magnetic flux leakage (MFL) measurements associated with a first liftoff distance of the at least one sensor with respect to a surface of the coiled tubing;

generating a second set of MFL measurements associated with a second liftoff distance of the at least one sensor with respect to the surface of the coiled tubing, based on performing a filtering operation on the first set of MFL measurements, the second liftoff distance being less than the first liftoff distance; and determining at least one defect of the coiled tubing, based on the second set of MFL measurements.

* * * * *